US011440190B1

(12) United States Patent
Maggi et al.

(10) Patent No.: US 11,440,190 B1
(45) Date of Patent: Sep. 13, 2022

(54) DETECTING UNSECURE DATA FLOW IN AUTOMATION TASK PROGRAMS

(71) Applicant: Trend Micro Incorporated, Tokyo (JP)

(72) Inventors: Federico Maggi, Vimercate (IT); Marcello Pogliani, Monza (IT); Davide Quarta, Amsterdam (NL); Martino Vittone, Vallauris (FR); Stefano Zanero, Milan (IT)

(73) Assignee: TREND MICRO INCORPORATED, Tokyo (JP)

( * ) Notice: Subject to any disclaimer, the term of this patent is extended or adjusted under 35 U.S.C. 154(b) by 343 days.

(21) Appl. No.: 16/822,346

(22) Filed: Mar. 18, 2020

Related U.S. Application Data

(60) Provisional application No. 62/981,953, filed on Feb. 26, 2020.

(51) Int. Cl.
*G06F 21/57* (2013.01)
*B25J 9/16* (2006.01)
*G06F 16/901* (2019.01)

(52) U.S. Cl.
CPC .......... *B25J 9/1674* (2013.01); *B25J 9/1658* (2013.01); *G06F 16/9024* (2019.01); *G06F 16/9027* (2019.01); *G06F 21/577* (2013.01)

(58) Field of Classification Search
CPC ... B25J 9/1674; B25J 9/1658; G06F 16/9027; G06F 16/9024; G06F 21/577
See application file for complete search history.

(56) References Cited

U.S. PATENT DOCUMENTS

| | | | | |
|---|---|---|---|---|
| 8,881,293 | B1 * | 11/2014 | Brucker | G06F 21/577 717/136 |
| 10,628,286 | B1 * | 4/2020 | Iyer | G06F 11/3612 |
| 10,657,025 | B2 * | 5/2020 | Iyer | G06F 8/433 |
| 11,036,866 | B2 * | 6/2021 | Iyer | G06F 16/9024 |
| 11,087,002 | B2 * | 8/2021 | Siman | G06F 11/3672 |
| 11,106,440 | B2 * | 8/2021 | Beit-Aharon | G06F 8/51 |
| 2010/0083240 | A1 * | 4/2010 | Siman | G06F 16/245 717/144 |
| 2012/0144376 | A1 * | 6/2012 | Van Eijndhoven | G06F 8/433 717/146 |

(Continued)

OTHER PUBLICATIONS

Cortesi et al., Static Analysis Techniques for Robotics Software Verification, 2013, IEEE International Symposium on Robotics, included in the IDS (Year: 2013).*

(Continued)

*Primary Examiner* — Joseph P Hirl
*Assistant Examiner* — Stephen T Gundry
(74) *Attorney, Agent, or Firm* — Beyer Law Group LLP

(57) ABSTRACT

An automation task program is inspected for unsecure data flow. The task program is parsed to generate a parse tree, which is visited to generate control flow graphs of functions of the task program. The control flow graphs have nodes, which have domain-agnostic intermediate representations. The control flow graphs are connected to form an intermediate control flow graph. The task program is deemed to have an unsecure data flow when data is detected to flow from a data source to a data sink, with the data source and the data sink forming a source-sink pair that is indicative of an unsecure data flow.

14 Claims, 8 Drawing Sheets

(56) References Cited

U.S. PATENT DOCUMENTS

| | | | | |
|---|---|---|---|---|
| 2015/0013011 | A1* | 1/2015 | Brucker | G06F 21/577 |
| | | | | 726/25 |
| 2018/0024820 | A1* | 1/2018 | Davis | G06F 8/443 |
| | | | | 717/155 |
| 2018/0067836 | A1* | 3/2018 | Apkon | G06F 8/34 |
| 2018/0129720 | A1* | 5/2018 | Kim | G06F 16/248 |
| 2018/0336020 | A1* | 11/2018 | Berg | G06F 16/9024 |
| 2018/0349115 | A1* | 12/2018 | Zhang | G06F 8/433 |
| 2019/0073228 | A1* | 3/2019 | Stanfill | G06F 9/4862 |
| 2020/0125475 | A1* | 4/2020 | Iyer | G06F 8/433 |
| 2020/0125478 | A1* | 4/2020 | Iyer | G06F 11/3604 |
| 2020/0125732 | A1* | 4/2020 | Iyer | G06F 21/577 |
| 2021/0019126 | A1* | 1/2021 | Rabinovitch | G06F 8/51 |

OTHER PUBLICATIONS

Agostino Cortesi, et al. "Static Analysis Techniques for Robotics Software Verification", 2013, 6 sheets, IEEE International Symposium on Robotics.

Avijit Mandal, et al. "A static analyzer for Industrial robotic applications", 2017, pp. 24-27, IEEE 28th International Symposium on Software Reliability Engineering Workshops.

Avjit Mandal, et al. "A Generic Static Analysis Framework for Domain-specific Languages", 2018, pp. 27-34, IEEE 23rd International Conference on Emerging Technologies and Factory Automation (ETFA).

Mu Zhang, et al. "Towards Automated Safety Vetting of PLC Code in Real-World Plants", 2019, 17 sheets, Proceedings—40th IEEE Symposium on Security and Privacy.

\* cited by examiner

DETECTING UNSECURE DATA FLOW IN AUTOMATION TASK PROGRAMS

CROSS-REFERENCE TO RELATED APPLICATION

This application claims the benefit of U.S. Provisional Application No. 62/981,953, filed on Feb. 26, 2020, which is incorporated herein by reference in its entirety.

BACKGROUND OF THE INVENTION

1. Field of the Invention

The present invention relates generally to device security, and more particularly but not exclusively to automation task programs.

2. Description of the Background Art

As its name indicates, an automation task program ("task program") comprises instructions that are executed by a device to perform a particular task. In the context of industrial robots, a task program comprises instructions that when executed cause a robot to perform a mechanical task, such as welding, pick-and-place, transport, assembly, or other manufacturing-related task on a factory floor. Task programs for industrial robots are also referred to herein as "industrial robot programs."

An industrial robot program is written in an Industrial Robot Programming Language (IRPL). An IRPL is inherently different from general-purpose programming languages, such as C/C++, C#, Go, Python, and PHP programming languages. First, different industrial robot vendors have different, proprietary IRPLs. That is, an IRPL is typically domain-specific and proprietary to one vendor. Second, the semantic of a typical IRPL is typically unique and different from general-purpose programming languages. Third, an IRPL, compared to general-purpose programming languages, typically has fewer features that make it easier for the programmer to avoid introducing vulnerabilities (e.g., string manipulation, cryptographic primitives). These and other differences make it difficult to evaluate the security of industrial robot programs using techniques employed for programs written in a general-purpose programming language.

SUMMARY

In one embodiment, an automation task program is inspected for unsecure data flow. The task program is parsed to generate a parse tree, which is visited to generate control flow graphs of functions of the task program. The control flow graphs have nodes, which have domain-agnostic intermediate representations. The control flow graphs are connected to form an intermediate control flow graph. The task program is deemed to have an unsecure data flow when data is detected to flow from a data source to a data sink, with the data source and the data sink forming a source-sink pair that is indicative of an unsecure data flow.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
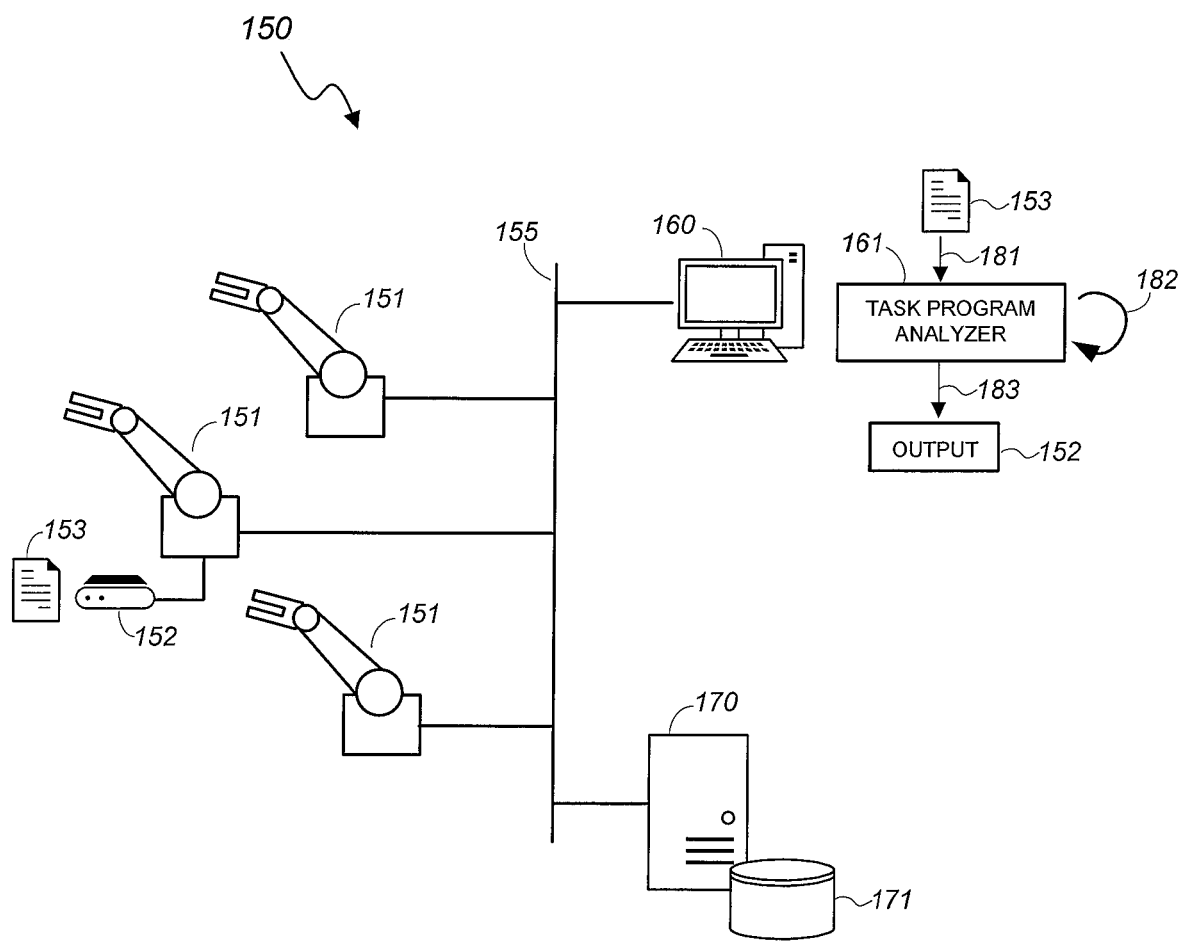
FIG. 1 is a logical diagram of an automation system in accordance with an embodiment of the present invention.

FIG. 1 is a logical diagram of an automation system 150 in accordance with an embodiment of the present invention. In the example of FIG. 1, the automation system 150 is that of an industrial facility, such as a factory. The automation system 150 includes one or more robots 151, a server 170, and an evaluation system 160. The robots 151, the server 170, the evaluation system 160, and other devices of the automation system 150 communicates over a computer network 155, which may be wired or wireless.

A robot 151 may comprise a commercially-available industrial robot, such as those from the ABB Robotics company, KUKA Robotics company, and other industrial robot vendors. A robot 151 may include one or more moveable members, such as arms, end effectors, and other movable mechanical structures. A robot 151 may include a control module 152 with a processor that executes instructions of a task program 153 to cause the robot 151 to move a moveable member to perform an automated task, such as to build a product, dispense liquid, transport or move a load, or other industrial automation task. The control module 152 may be integrated in the housing of the robot 151 or in a separate housing that is directly connected to the robot 151.

In the example of FIG. 1, the task program 153 is an industrial robot program that is written in a proprietary, domain-specific IRPL. The task program 153 is in source-code, human-readable form. The task program 153 may be written in the RAPID robot programming language, the KRL robot programming language, or other programming language for industrial robots. The task program 153 may be loaded onto the control module 152 of the corresponding robot 151 directly (e.g., from a local storage or input port of the control module 152) or over the computer network 155.

The server 170 may comprise computer hardware and associated software for providing file storage or other service to the robots 151. In the example of FIG. 1, the server 170 includes a storage device 171 that may store task programs 153 for loading onto the robots 151 over the computer network 155. The storage device 171 may also store configuration files for the robots 151.

An unsecure data flow is flow of data, from a data source to a data sink, that creates a vulnerability in a robot 151. A data source is an instruction or a function that may receive untrustworthy data, whereas a data sink is an instruction or a function that operates on received data. In the present disclosure, "function" includes a procedure, a subroutine, or other callable code block in a task program. As can be appreciated, a function may comprise a plurality of instructions.

An unsecure data flow in a task program 153 may cause a robot 151 to move a moveable member (e.g., swing an arm) in an unsafe manner during operation, creating a physical safety issue that may harm personnel who work in the vicinity of the robot 151. An unsecure data flow may also make the task program 153 susceptible to inadvertent programming errors. Additionally, an unsecure data flow poses a security risk that may be exploited by an attacker to maliciously control the robot 151 or to attack other devices connected to the computer network 155.

Unsecure data flow may make the robot 151 vulnerable to externally-received untrustworthy data, such as data from outside the task program 153. For example, a task program 153 may receive external inputs from files, communication interfaces (e.g., computer network 155, serial communication bus, fieldbuses), a user interface of a teach pendant, or other external input source. Such external inputs to the robot 151 can be exploited by an attacker. For example, data files can be tampered with by malicious third-parties (e.g., contractors); inbound communication data can originate from compromised devices on the computer network 155 or other endpoints; and user interfaces of teach pendants can be manipulated by an insider.

Table 1 below summarizes example external inputs that may be exploited by an attacker.

TABLE 1

| External Input | Intended Legitimate Use | Example Attack Scenario |
|---|---|---|
| File | Static data from configuration files | By a contractor |
| Inbound Communication (e.g., Network, serial, field bus) | Dynamic real-time data | From untrusted networks or endpoints |
| Teach Pendant (i.e., user interface Forms) | Operator-supplied data | By an Insider |

The inventors identified at least four categories of sensitive data sinks, which may be an instruction or function that may render a task program vulnerable. "Data sinks" and "data sources" are also simply referred to herein as "sinks" and "sources", respectively.

A first category of sensitive data sinks comprises instructions or functions that perform movement commands. More particularly, the first category of sensitive data sinks receives data that are used to control the trajectory of a moveable member of a robot. Data sinks of the first category are widely used as a way to control or influence a robot's movement from an external program. For example, MELFA robots from the Mitsubishi Electric company support an Mxt (move external) instruction, which allows a robot to be controlled by way of User Datagram Protocol (UDP) packets containing information about robot position. Similarly, the ABB Robotics company provides the Robotware Externally Guided Motion option, which allows an external device to perform direct motion control of the robot.

A second category of sensitive data sinks comprises instructions or functions that perform file and configuration handling. Tainted data received from a sensitive data source (e.g., network socket) may be used as part of the filename parameter of a file open or configuration open instruction without validation. This vulnerability enables a network attacker to control the name of the configuration file to be opened and read, allowing the attacker to access confidential information (e.g., intellectual property) stored in files or to modify information in configuration files. If the robot control module has a structured file system rather than a flat file system, this vulnerability may also lead to the classic directory traversal vulnerability.

A third category of sensitive data sinks comprises instructions or functions that perform file and configuration modification. Orthogonal to the second category of sensitive data sinks, untrustworthy data may be used as the content to be written in configuration files or passed as parameter to configuration setting functions. If data is not sanitized (e.g., checked against a white list or against an acceptable range), an attacker may overwrite configuration values in an unexpected and potentially unsecure way.

A fourth category of sensitive data sinks comprises instructions or functions that are called by name. More particularly, some IRPLs have the capability of resolving, at runtime and programmatically (e.g., by "late binding"), the names of the functions to be called. For example, a developer may use, in the RAPID robot programming language, the % fun_name % instruction in order to call a function, where "fun_name" is a variable containing the function to be called. If the fun_name variable originates from an untrusted data source and there is no input validation, the task program is vulnerable; an attacker may subvert the control flow of the task program, with varying effects according to the semantics of the loaded module.

Table 2 below summarizes the above-described sensitive data sinks by functionality.

TABLE 2

| Data Sink Functionality | Intended Legitimate Use | Attacker Goal |
|---|---|---|
| Movement | Programmatically maneuver the robot | Unintended robot movement |
| File and Configuration Handling | Read arbitrary files | Data exfiltration |
| File and Configuration Modification | Write configuration | Implant a backdoor |
| Call by Name | Write parametric and generic code | Divert the control flow |

Besides the presence of vulnerabilities, the complexity of IRPLs renders them susceptible to be used as a way to codify malicious functionalities. Malicious code, which are also referred to herein as "malware", may steal information, drop and execute second-stage malware, or perform other malicious actions in the automation system 150. The inventors identified at least two cases of malicious functionalities that can be implemented in an IRPL.

A first case is the information stealer malware. This is particularly relevant in industrial settings because both the configuration parameters and the task programs residing on the robot control module are considered high valuable intellectual property and are thus attractive targets for attackers. An information stealer malware may, for example, exfiltrate confidential information from local files through an outbound connection.

A second case is the dropper malware. This piece of malware allows the attacker to download and execute a second-stage malware. In one embodiment, the task program analyzer 161 is able to detect a dropper malware as a pattern. More particularly, the task program analyzer 161 may detect malware based on flow of data from a sensitive data source to a sensitive data sink, which is also referred to herein as a "source-sink pair".

Table 3 below provides a summary of malware, including their actions, sensitive data source, and sensitive data sink.

TABLE 3

| Malware | Malicious Action | Data Source | Data Sink |
| --- | --- | --- | --- |
| Information stealer | Exfiltration | File | Outbound network |
| | Exfiltration | Config | Outbound network |
| | Harvesting | Directory list | File |
| Dropper | Download | Communication | File (code) |
| | Execute | File (Code) | Call by name |

In the example of FIG. 1, the evaluation system 160 comprises computer hardware and associated software for detecting unsecure data flow in task programs 153. The evaluation system 160 may include a task program analyzer 161, which in one embodiment comprises instructions that are stored in a memory of the evaluation system 160 and executed by a processor of the evaluation system 160 to cause the evaluation system 160 to detect unsecure data flow in task programs 153. More particularly, the task program analyzer 161 may receive a task program 153 (see arrow 181), evaluate the task program 153 for unsecure data flows (see arrow 182), and generate a result of the evaluation as an output 152 (see arrow 183). The output 152 may indicate whether or not the task program 153 has an unsecure data flow. In one embodiment, the task program analyzer 161 performs data flow analysis between predetermined sensitive data sources and predetermined data sinks. The sensitive data sources may be defined as taint sources and the sensitive data sinks may be defined as taint sinks. The task program analyzer 161 may detect unsecure data flow in the task program 153 when data flow from a taint source to a taint sink that have been defined as a source-sink pair indicative of unsecure data flow. The source-sink pair may be indicated in the output 152.

In response to detecting an unsecure data flow in a task program 153, one or more corrective actions may be performed to prevent the task program 153 from being executed by a robot 151. More particularly, the task program 153 may be put into quarantine, deleted, further analyzed for correction, etc. An alert, such as by email, log entry, visual indicator, alarm, etc. may also be raised in response to detecting an unsecure data flow.

Figure 2:
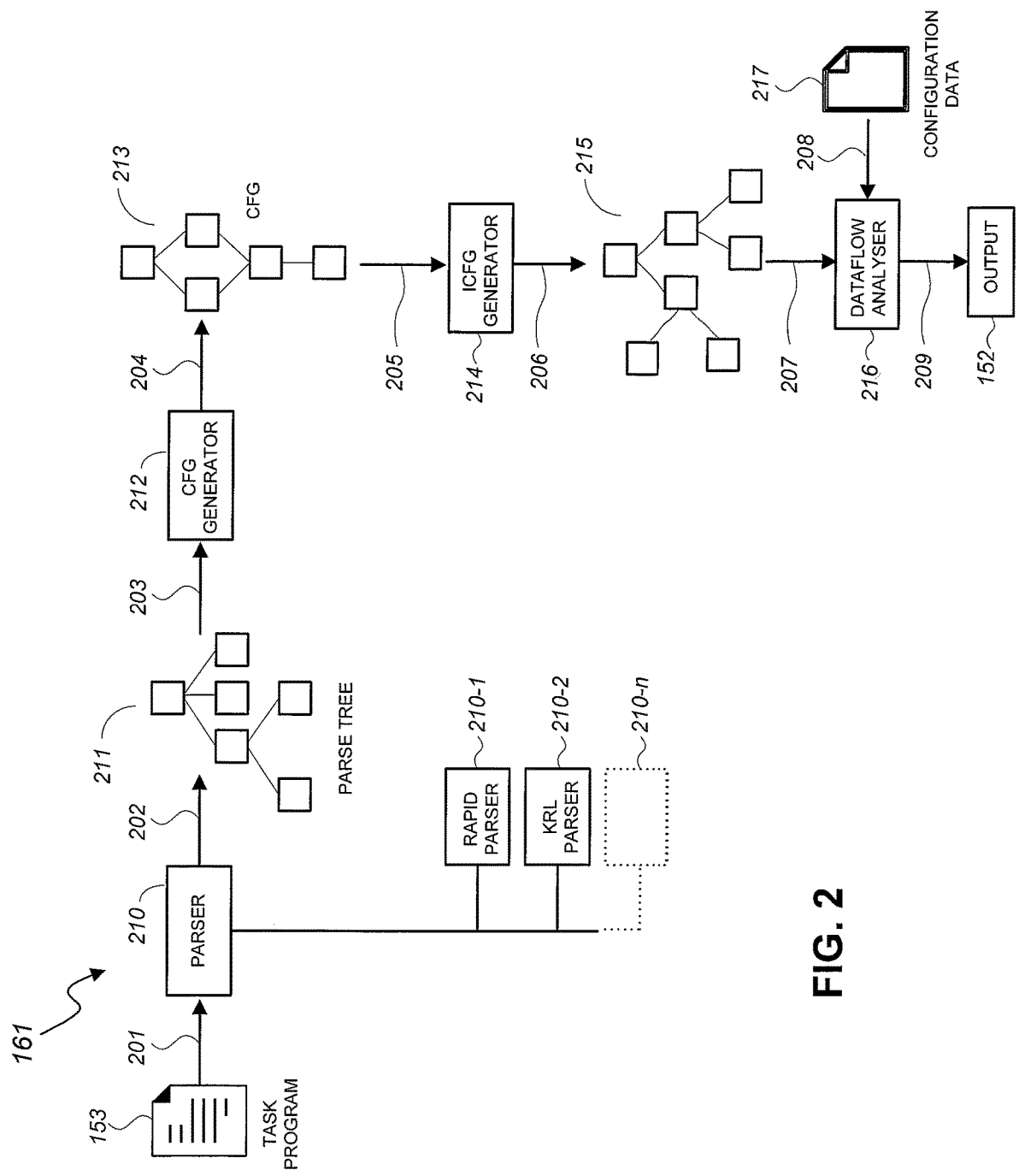
FIG. 2 is a logical diagram of a task program analyzer in accordance with an embodiment of the present invention.

FIG. 2 is a logical diagram of the task program analyzer 161 in accordance with an embodiment of the present invention. In the example of FIG. 2, the task program analyzer 161 comprises a plurality of parsers 210 (i.e., 210-1, 210-2, . . . , 210-n), a control flow graph (CFG) generator 212, an intermediate control flow graph (ICFG) generator 214, and a dataflow analyzer 216. In one embodiment, the task program analyzer 161 is a source code static analyzer. That is, the task program analyzer 161 evaluates the source code of a task program 153 statically, i.e., not at runtime.

In one embodiment, the task program analyzer 161 includes a parser 210 for each IRPL that is recognized by the task program analyzer 161. For example, the task program analyzer 161 may include a parser 210-1 for parsing a task program written in the RAPID robot programming language, a parser 210-2 for parsing a task program written in the KRL robot programming language, etc.

A parser 210 is configured to receive a task program 153 (see arrow 201) and parse the objects (e.g., functions, data, variables) of the task program to identify the syntactic relationships of the objects to each other according to the grammar of a particular IRPL. In the example of FIG. 2, the parser 210 outputs a parse tree 211 (see arrow 202), which represents the syntactic relationships between objects of the task program 153.

In one embodiment, a parser 210 is implemented using the ANTLR Parser Generator. As can be appreciated, other parser generators may also be employed without detracting from the merits of the present invention. The ANTLR Parser Generator may be used to generate a lexical analyzer and a parser from a specification of a corresponding IRPL grammar. Grammars of an IRPL may be developed from information available in reference manuals of the IRPL, by looking at existing task programs written in the IRPL, etc. As a particular example, the official language reference for the RAPID robot programming language includes portions of the extended Backus-Naur form (EBNF) grammar, which may be ported to the ANTLR Parser Generator to generate the parser 210-1 for the RAPID robot programing language.

In one embodiment, the CFG generator 212 is configured to generate a plurality of CFGs 213, a separate CFG 213 for each function of a parsed task program 153. In the example of FIG. 2, the CFG generator 212 visits the parse tree 211 of the parsed task program 153 (see arrow 203) to build one or more CFGs 213 (see arrow 204) in memory. Each node of a CFG 213, which is also known as a "basic block", contains a list of instructions. These instructions in the nodes of the CFG 213 are expressed in a language-independent, simplified, intermediate representation. That is, the instructions in the nodes of the CFG 213 are domain-agnostic and not specific to a particular IRPL. In one embodiment, the intermediate representations do not preserve the complete semantics of the instructions, but only their data flow. This is because, in one embodiment, the data flow is all that is needed for subsequent taint analysis performed using the dataflow analyzer 216.

A modular approach may be taken to make the task program analyzer 161 easily extensible to recognize different IRPLs. As a particular example, the parser 210 and the CFG generator 212, which may be implemented using the ANTLR Parser Generator visitor pattern, are tailored for a specific IRPL; the rest of the components of the task program analyzer 161 may be used for different IRPLs. A CFG may be simplified by running a set of IRPL-agnostic simplification passes, such adding CFG edges at "goto" statements, enforcing a single exit point/return for the CFG of each function, eliminating dead code blocks, etc.

The ICFG generator 214 is configured to generate an ICFG 215 (see arrow 206), which connects the CFGs 213 together at function calls (see arrow 205). In one embodiment, to build the ICFG 215, the ICFG generator 214 visits the CFG 213 of each function and replaces nodes that have calls to functions defined in the same module (i.e., functions where the CFG 213 is available) with two CFG edges:

(a) a first edge from the instruction immediately preceding the call to the entry basic block of the called CFG. To properly model the data flow from the function calls' actual parameters to the function's formal parameters, additional assignment nodes may be added along this first edge; and (b) a second edge from the exit basic block of the called CFG to the instruction following the call. Additional nodes may be added to correctly propagate the returned value to the caller, as well as to propagate the value of any output parameter declared as such in the function prototype.

With the above procedure, the ICFG generator 214 is used to build an extended control and data flow graph of all the functions in the target task program 153 being evaluated.

In one embodiment, the dataflow analyzer 216 is configured to analyze flow of data through the ICFG 215 to detect vulnerabilities caused by unsecure data flow in the task program 153. The dataflow analyzer 216 may perform a forward-only dataflow analysis for taint tracking, which propagates taint information from sensitive data sources (e.g., inbound network data) towards all the basic blocks (i.e., nodes) in the task program 153. Any input parameter of instructions and functions defined as data sinks (e.g., coordinates passed to robot-movement functions) may be checked to determine if the input parameter was tainted and by which data source. For each node in the ICFG 215 and for each variable, the analysis algorithm may compute the set of "taints", i.e., the set of data sources that influenced the value of the variable.

A work-list based iterative algorithm may be used by the dataflow analyzer 216 to compute the result of the dataflow analysis. More particularly, the dataflow analysis may be defined by a carrier lattice that represents the taint information computed for each node of the ICFG 215, and by a transfer function that defines how the taint information is propagated according to the semantics of each instruction. Elements in the carrier lattice may be the set of data sources that taint each variable. The transfer function may be defined as a function that propagates the taint information from the variables used by the instruction to the variables defined by the instruction. For example, the transfer function for a binary operation adds, to the taint information of the result, the union of the taint information of the two operands.

A function call may refer to another function that is not present in the task program being analyzed. For example, a function call may be to library functions or to functions defined in a file not available to the dataflow analyzer 216. In that case, because the dataflow analyzer 216 does not have the function's CFG, the behavior of the function may be approximated by assuming that the function uses all parameters to compute the return value, if any. Hence, the default transfer function for the function call adds, to the taint information of the return value, the union of the taint information of all the parameters. However, there are library functions that may not work this way. More particularly, a library function may have output parameters and also accept parameters that do not influence the result in a security-sensitive way. To address this, function calls to library functions may be modeled in an IRPL-specific fashion. That is, for each supported IRPL and for each library function, parameters that are considered inputs and parameters that are considered outputs may be specified for taint propagation purposes.

The transfer function employed by the dataflow analyzer 216 may support the concept of sanitization, i.e., an operation that removes the taint from a variable. This reflects the behavior of functions that are used for input sanitization or functions that change the handled resource. For example, to monitor for data that is written (e.g., in the case of exfiltration) to a user-controlled file, the Close instruction may be considered as a sanitizer, because further uses of the same, closed file descriptor would necessarily refer to a different file. The dataflow analyzer 216 may support a set of sanitizers that are defined in a configuration data 217.

In one embodiment, unsecure data flow to be detected in task programs are defined in terms of source-sink pairs. The source-sink pairs for detecting unsecure data flow may defined in the configuration data 217, which is input to the dataflow analyzer 216 (see arrow 208).

As a particular example pertaining to the KRL robot programming language for KUKA industrial robots, functions that receive data from the computer network via the KUKA.Ethernet KRL extension, functions starting with eki_get (e.g., eki_getreal), and functions belonging to the KUKA.Ethernet KRL XML package (e.g., EKX_GetIntegerElement) may be defined as sensitive data sources. Instructions involving movements, such as ptp, lin, and circ, may be defined as sensitive data sinks. As another particular example pertaining to the RAPID robot programming language for ABB robots, the SocketReceive (i.e., Str and RawData) instruction may be defined as a sensitive data source. Functions involving movement, file and configuration-handling, and late binding, such as those with Move, Open, OpenDir, SaveCfgData, WriteCfgData, Load, and CallByVar instructions, may be defined as sensitive data sinks. In general, sensitive data sources may be paired with sensitive data sinks to form predetermined source-sink pairs that are indicative of unsecure data flow.

To detect malware, source-sink pairs may be defined using data sources and data sinks that are shown in Table 3 above, for example.

Unsecure data flow is detected in a task program 153 when data flow from a data source to a data sink that are defined as a source-sink pair. The dataflow analyzer 216 may generate an output 152 (see arrow 209) that indicates the result of evaluation of the task program 153 for unsecure data flow. The output 152 may indicate whether or not the task program 153 has one or more unsecure data flows and, when the task program 153 is detected to have an unsecure data flow, the corresponding source-sink pair.

As a particular example, to detect exfiltration of data in the RAPID robot programming language, taint information propagation from the ReadRawBytes instruction (and other device read instructions) to the SocketSend instruction may be monitored. The ReadRawBytes instruction and the SocketSend instruction may be defined as a source-sink pair. Unsecure data flow that is potentially by malware is detected when the taint information propagates from a function with the ReadRawBytes instruction to a function with the SocketSend instruction.

An example operation of the task program analyzer 161 is now described with reference to FIGS. 3-6. The example operation evaluates a target task program that has the following source code:

```
MODULE TestModule2
  PROC proc1(num q)
    VAR num i;
    SocketReceive \Str:=i;
    FOR j FROM 1 TO q DO
      res1 := fun1(i);
    ENDFOR
    res1 := res1 + 2;
    proc2(res1);
  ENDPROC
  PROC proc2(num t)
    VAR num j;
    res2 := fun2(t);
    MoveAbsJ res2;
    j := j + 100;
```

```
ENDPROC
ENDMODULE
```

The target task program has two functions, namely functions proc1 and proc2. The target task program is written in the RAPID robot programming language. The target task program is parsed with a corresponding parser 210. The parsing of the target task program generates a parse tree, which is input to the CFG generator 212 to generate a CFG for each of the functions proc1 and proc2.

Figure 3:
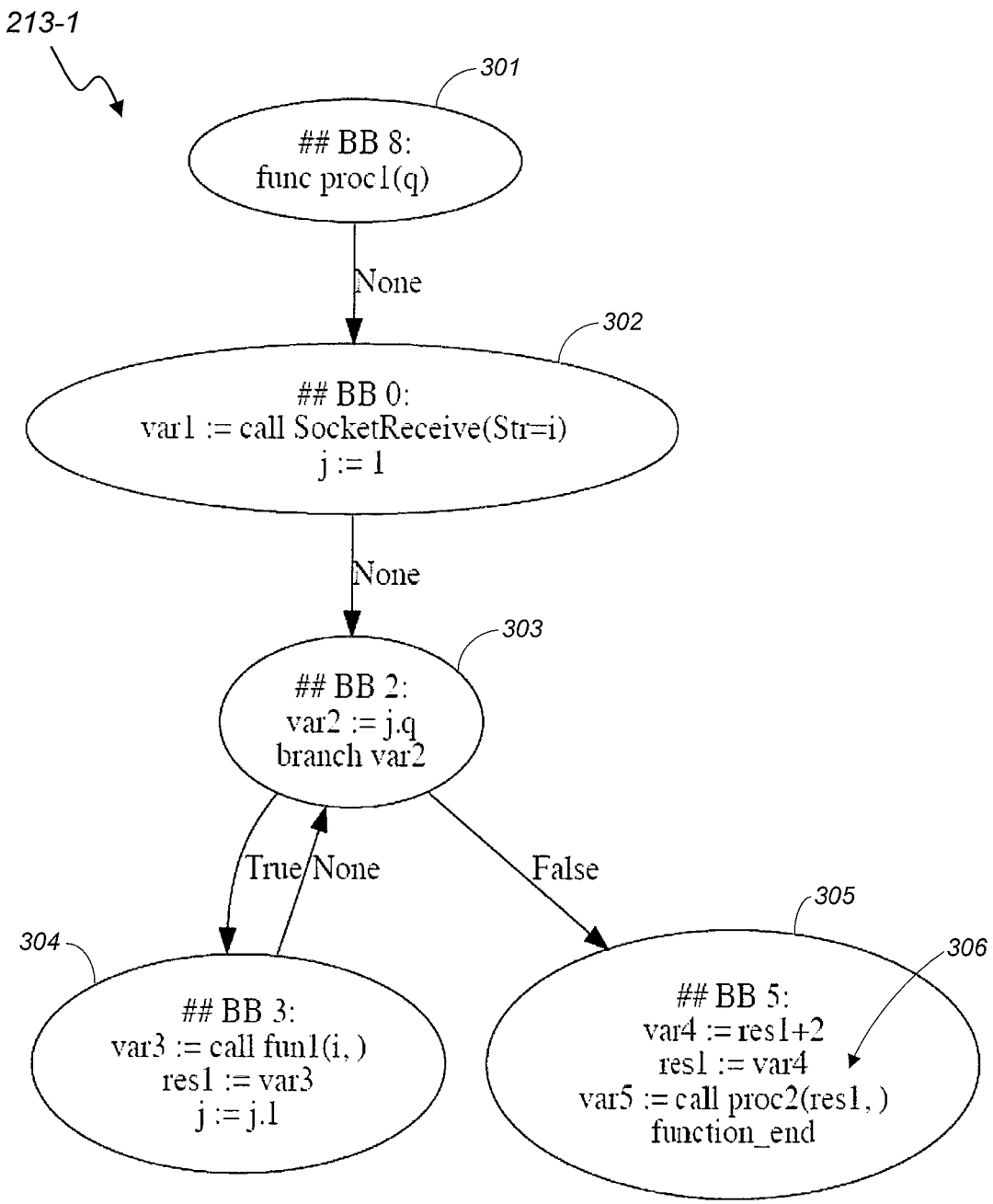
FIGS. 3 and 4 are graphical representations of control flow graphs of functions of an example task program, in accordance with an embodiment of the present invention.
Figure 4:
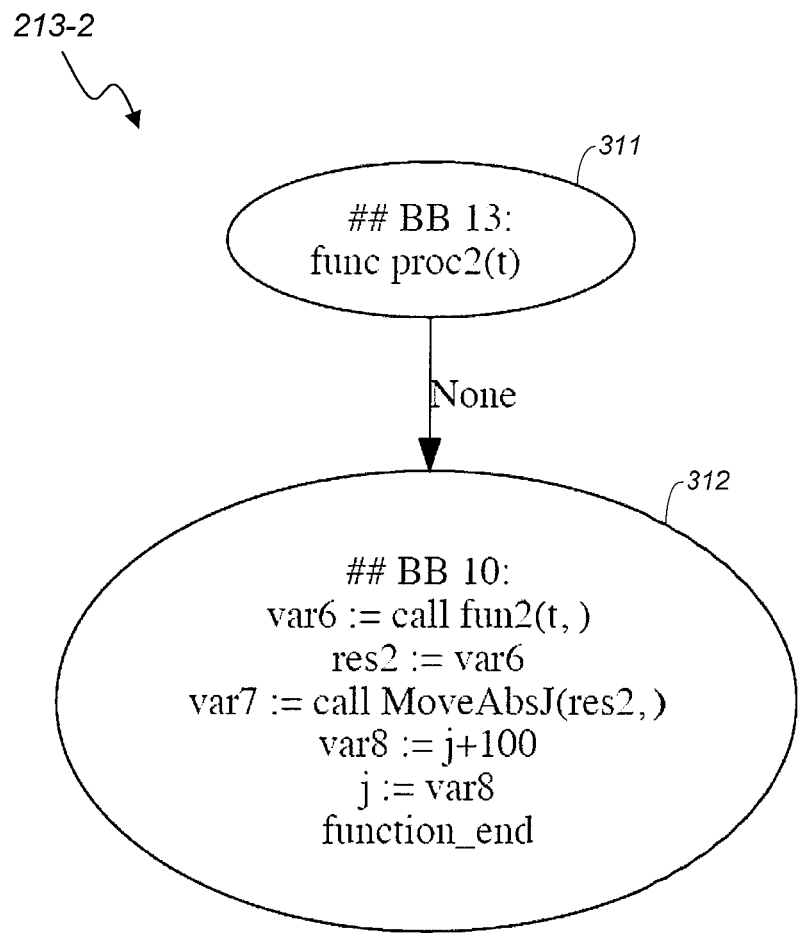

FIG. 3 is graphical representation of a CFG 213-1 of the function proc1 and FIG. 4 is a graphical representation of a CFG 213-2 of the function proc2. The CFG 213-1 has nodes 301-305. Similarly, the CFG 213-2 has nodes 311 and 312.

Figure 5:
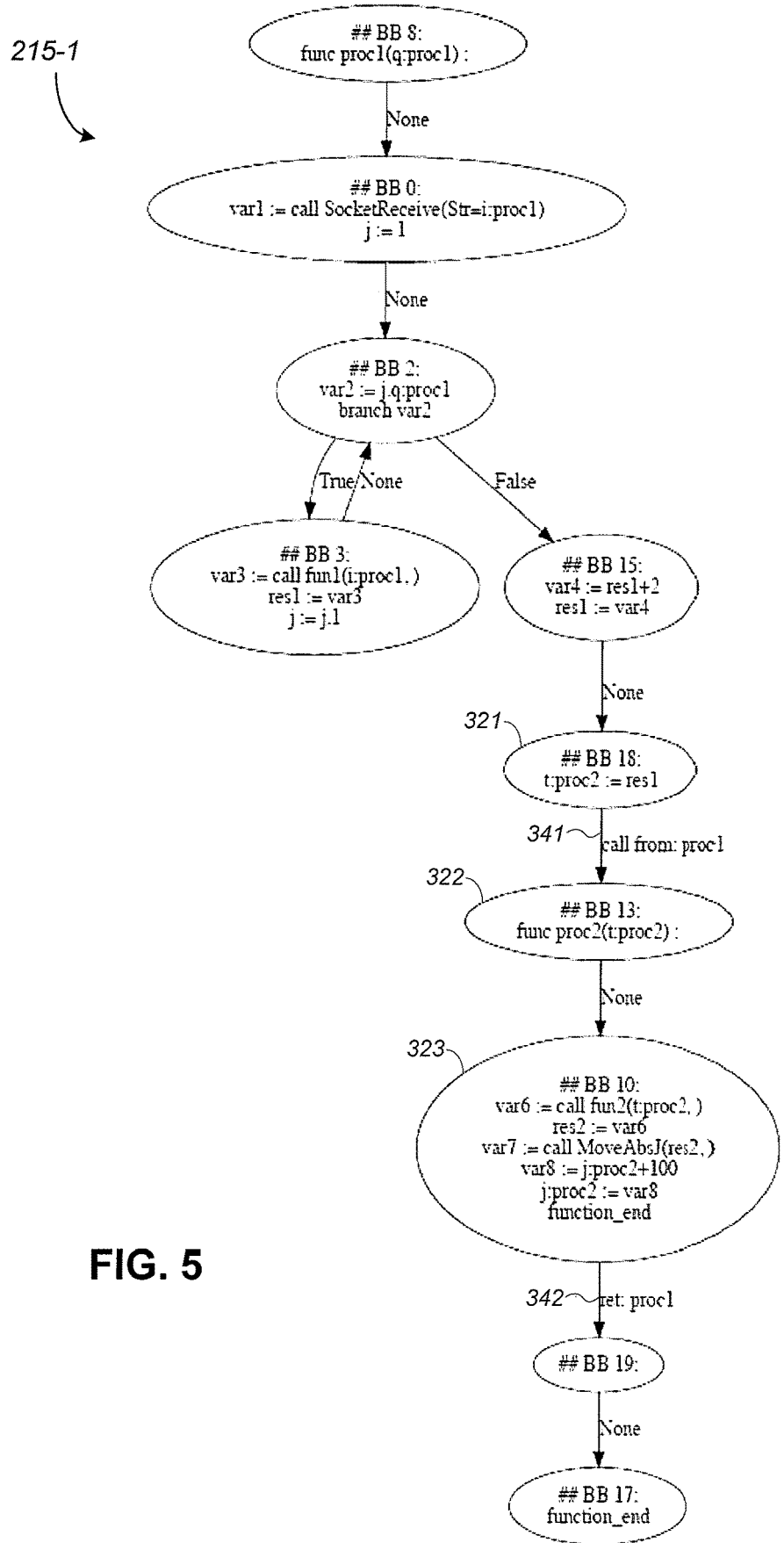
FIG. 5 is a graphical representation of an intermediate control flow graph that includes the control flow graphs of FIGS. 3 and 4, in accordance with an embodiment of the present invention.

The ICFG generator 214 generates an ICFG 215-1 (see FIG. 5) that connects the CFG 213-1 of the function proc1 to the CFG 213-2 of the function proc2. FIG. 5 is a graphical representation of the ICFG 215-1. The function proc1 makes a call to the function proc2 (see FIG. 3, arrow 306), which is reflected by the node 321 of the ICFG 215-1. The ICFG generator 214 generates a first edge 341 from the instruction of the node 321 to the node 322, which is the entry basic block of the function proc2. The ICFG generator 214 also generates a second edge 342 from the node 323, which is the exit basic block of the function proc2, to the end of the ICFG 215-1. If another instruction follows the function proc2, the edge 342 would be connected to that instruction.

Figure 6:
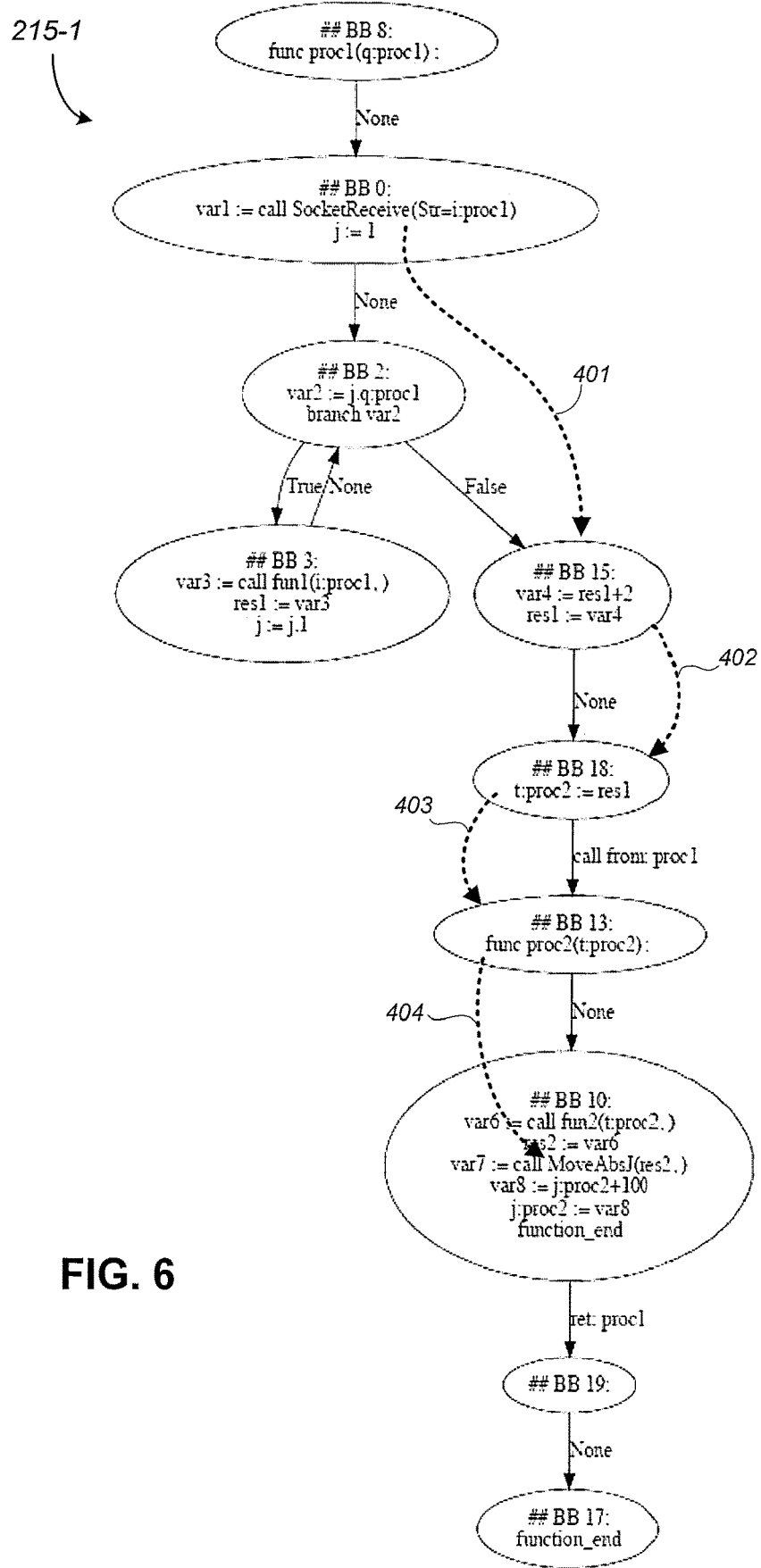
FIG. 6 is a graphical representation of the intermediate control flow graph of FIG. 5, showing data flow analysis in accordance with an embodiment of the present invention.

FIG. 6 is a graphical representation of the ICFG 215-1, showing data flow analysis performed by the dataflow analyzer 216 in the example operation. In the example operation, a source-sink pair for detecting an unsecure data flow has the SocketReceive instruction as the data source and the MoveAbsJ instruction as the data sink. The SocketReceive instruction is sensitive in that it receives data over a computer network, and the MoveAbsJ instruction is sensitive because it involves robot arm movement. Accordingly, an execution path from a function with the SocketReceive instruction to another function with the MoveAbsJ instruction is deemed to be an unsecure data flow.

In the example operation, the SocketReceive instruction is present in the function proc1 (see also FIG. 3, node 302) and the MoveAbsJ instruction is present in the function proc2 (see also FIG. 4, node 312). During data flow analysis, data is detected to flow from the SocketReceive instruction of the function proc1 to the MoveAbsJ instruction of the function proc2 (FIG. 6, arrows 401-404). Accordingly, the target task program 153 is detected to have an unsecure data flow.

Figure 7:
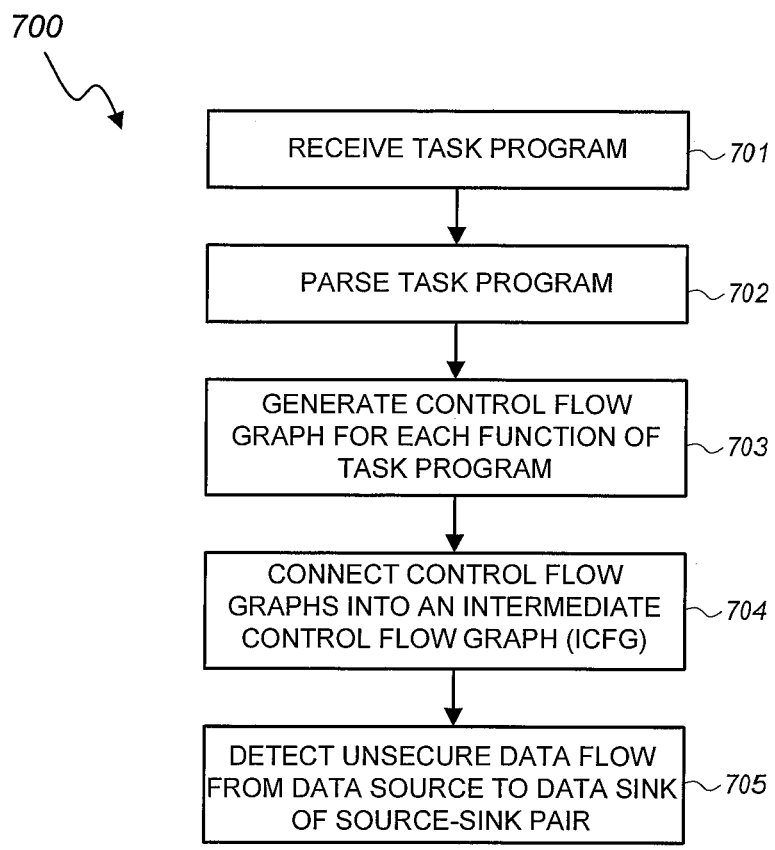
FIG. 7 is a flow diagram of a method of detecting unsecure data flow in a task program in accordance with an embodiment of the present invention.

FIG. 7 is a flow diagram of a method 700 of detecting unsecure data flow in a task program in accordance with an embodiment of the present invention. The method 700 may be performed by the task program analyzer 161 to evaluate a task program prior to the task program being loaded to a robot 151.

In the example of FIG. 7, a task program to be evaluated for unsecure data flow is received (step 701) in the evaluation system 160. There, the task program analyzer 161 parses the task program for readily identification of the objects of the task program and their relationships (step 702). In one embodiment, the parsing of the task program generates a parse tree that is visited (i.e., traversed) by the task program analyzer 161 to identify functions of the task program and generate a CFG for each of the functions (step 703). The task program analyzer 161 generates an ICFG that connects together the CFGs of the functions according to their calling relationships (step 704). In one embodiment, unsecure data flows are defined as source-sink pairs. The task program analyzer 161 monitors data flow between predetermined data sources and data sinks (e.g., in the ICFG) and detects presence of unsecure data flow when data is detected to flow from a data source to a data sink that are designated as a source-sink pair for detecting an unsecure data flow (step 705).

Although the above embodiments are described in the context of industrial robots, one of ordinary skill in the art will appreciate that, in light of the present disclosure, the present invention may be applied to other special-purpose devices that execute domain-specific programming languages. For example, the present invention is equally applicable to a network of Internet-of-Things (IOT) devices from different vendors. Such IOT devices may execute task programs that are written in different, special-purpose programming languages. In that case, task programs for the IOT devices may be evaluated for one or more unsecure data flow in the same manner as described above. More specifically, a task program for an IOT device may be parsed, a parse tree of the parsed task program may be visited to generate CFGs for each function of the task program, an ICFG of the CFGs may be generated, and data flow of the ICFG may be analyzed to detect an unsecure data flow code sequence as described above for task programs of industrial robots.

Figure 8:
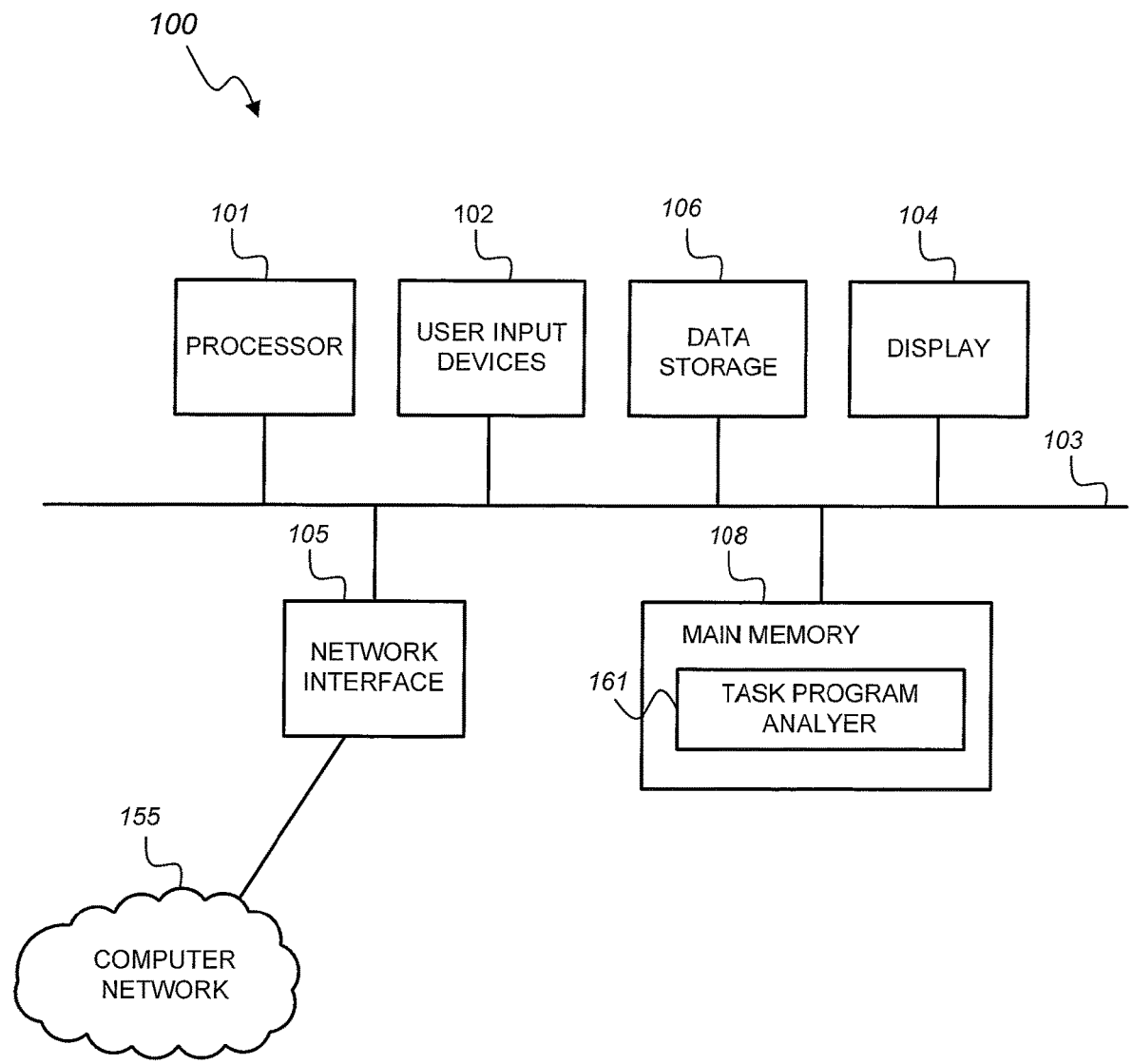
FIG. 8 is a logical diagram of a computer system in accordance with an embodiment of the present invention.

Referring now to FIG. 8, there is shown a logical diagram of a computer system 100 that may be employed with embodiments of the present invention. The computer system 100 may be employed as the evaluation system 160 or another computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network, which in this example is the computer network 155.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules. In one embodiment where the computer system 100 is configured as the evaluation system 160, the software modules comprise a task program analyzer 161.

Systems and methods for detecting unsecure data flow in task programs have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting unsecure data flows in task programs, the method comprising:
   receiving a task program for controlling motion of an industrial robot, the task program being written in an industrial robot programming language;
   parsing the task program to generate a parse tree;
   generating a plurality of separate control flow graphs for functions of the task program, each of the control flow graphs comprising a plurality of basic blocks, each of the basic blocks comprising domain-agnostic intermediate representations;
   generating an intermediate control flow graph that connects the control flow graphs together;
   detecting data flow from a data source to a data sink in the intermediate control flow graph, the data source and the data sink forming a predetermined source-sink pair that is indicative of an unsecure data flow; and
   in response to detecting the data flow from the data source to the data sink in the intermediate control flow graph, deeming the task program to have the unsecure data flow.

2. The method of claim 1, wherein generating the plurality of separate control flow graphs includes visiting the parse tree.

3. The method of claim 1, wherein the data source is an instruction for receiving an external input to the task program and the data sink is an instruction for moving a moveable member of the industrial robot.

4. The method of claim 3, wherein the moveable member of the industrial robot is a robot arm.

5. The method of claim 1, further comprising:
   preventing the task program from being executed by the industrial robot in response to deeming the task program to have the unsecure data flow.

6. A system for detecting unsecure data flows in task programs, the system comprising at least one processor and a memory, the memory storing instructions that when executed by the at least one processor cause the system to:
   receive a task program, the task program being written in a programming language for a special-purpose device;
   parse the task program to generate a parse tree of the task program;
   visit the parse tree to generate a first control flow graph for a first function of the task program and a second control flow graph for a second function of the task program;
   detect data flow from a data source to a data sink between the first and second control flow graphs, the data source and the data sink forming a predetermined source-sink pair that is indicative of an unsecure data flow; and
   in response to detecting the data flow from the data source to the data sink, prevent execution of the task program by the special-purpose device,
   wherein the special-purpose device is an industrial robot.

7. The system of claim 6, wherein the data source is an instruction for receiving an external input to the task program and the data sink is an instruction for moving a moveable member of the industrial robot.

8. The system of claim 6, wherein the instructions stored in the memory, when executed by the at least one processor, further cause the system to:
   generate an intermediate control flow graph that connects the first control flow graph to the second control flow graph; and
   detect the unsecure data flow in the intermediate control flow graph.

9. The system of claim 6, wherein each of the first and second control flow graphs comprises a plurality of basic blocks, and each of the basic blocks comprises domain-agnostic intermediate representations.

10. A method of detecting unsecure data flows in task programs, the method comprising:
    receiving a task program, the task program being written in a programming language for a special-purpose device;
    parsing the task program to generate a parse tree of the task program;
    visiting the parse tree to generate a first control flow graph for a first function of the task program and a second control flow graph for a second function of the task program;
    detecting data flow from a data source to a data sink between the first and second control flow graphs, the data source and the data sink forming a predetermined source-sink pair that is indicative of an unsecure data flow; and
    in response to detecting the data flow from the data source to the data sink in the intermediate control flow graph, deeming the task program to have the unsecure data flow,
    wherein the special-purpose device is an industrial robot.

11. The method of claim 10, wherein the data source is an instruction for receiving an external input to the task program and the data sink is an instruction for moving a moveable member of the industrial robot.

12. The method of claim 10, wherein the programming language is an industrial robot programming language.

13. The method of claim 10, wherein each of the first and second control flow graphs comprises a plurality of basic blocks, with each of the basic blocks comprising domain-agnostic intermediate representations.

14. The method of claim 10, further comprising:
    generating an intermediate control flow graph that connects the first control flow graph to the second control flow graph; and
    detecting the unsecure data flow in the intermediate control flow graph.

* * * * *